US006146729A

United States Patent [19]

Nihda

[11] Patent Number: 6,146,729

[45] Date of Patent: Nov. 14, 2000

[54] FILM SEAL

[76] Inventor: Christopher J. P. Nihda, 7080 Copenhagen Road-Unit #88, Mississauga, Ontario, Canada, L5N 2C9

[21] Appl. No.: 09/070,567

[22] Filed: Apr. 30, 1998

[51] Int. Cl.[7] .......... B32B 9/00

[52] U.S. Cl. .......... 428/40.1; 428/42.1; 428/192; 428/194; 283/81; 283/72; 283/10; 215/251; 215/273; 220/315; 220/359.2

[58] Field of Search .......... 428/916, 194, 428/42.1, 40.1, 906; 283/81, 72, 10; 215/254, 273, 277, 232, 251; 220/315, 359.2

[56] References Cited

U.S. PATENT DOCUMENTS

| | | | |
|---|---|---|---|
| D. 198,342 | 6/1964 | William | D58/8 |
| 2,295,658 | 9/1942 | Hog | 215/251 |
| 3,615,714 | 10/1971 | Lioyd | 99/171 C |
| 4,312,523 | 1/1982 | Haines | 283/18 |
| 4,869,383 | 9/1989 | Bahr | 215/232 |
| 4,964,513 | 10/1990 | Ingram | 206/459 |
| 5,119,964 | 6/1992 | Witt | 215/251 |
| 5,292,018 | 3/1994 | Travisano | 215/246 |

*Primary Examiner*—Elizabeth M. Cole
*Assistant Examiner*—Arti R. Singh

[57] ABSTRACT

A new film seal for providing a seal which allows a user to easily ascertain whether a roll of film has been exposed or is a new roll of film. The inventive device includes an elongate strip with an adhesive provided on one of the surfaces of the strip. The adhesive is adapted for adhesively coupling the first surface of the strip to an object. One of the ends of the strip has a lifting tab adapted for aiding the detachment of the strip from an object.

13 Claims, 2 Drawing Sheets

FILM SEAL

BACKGROUND OF THE INVENTION

1. Field of the Invention

The present invention relates to film seals and more particularly pertains to a new film seal for providing a seal which allows a user to easily ascertain whether a roll of film has been exposed or is a new roll of film.

2. Description of the Prior Art

The use of film seals is known in the prior art. More specifically, film seals heretofore devised and utilized are known to consist basically of familiar, expected and obvious structural configurations, notwithstanding the myriad of designs encompassed by the crowded prior art which have been developed for the fulfillment of countless objectives and requirements.

Known prior art film seals include U.S. Pat. No. 4,312,523; U.S. Pat. No. 3,946,507; U.S. Pat. No. 5,312,136; U.S. Pat. No. 4,930,812; U.S. Pat. No. Des. 306,321; and U.S. Pat. No. 5,435,600.

While these devices fulfill their respective, particular objectives and requirements, the aforementioned patents do not disclose a new film seal. The inventive device includes an elongate strip with an adhesive provided on one of the surfaces of the strip. The adhesive is adapted for adhesively coupling the first surface of the strip to an object. One of the ends of the strip has a lifting tab adapted for aiding the detachment of the strip from an object.

In these respects, the film seal according to the present invention substantially departs from the conventional concepts and designs of the prior art, and in so doing provides an apparatus primarily developed for the purpose of providing a seal which allows a user to easily ascertain whether a roll of film has been exposed or is a new roll of film.

SUMMARY OF THE INVENTION

In view of the foregoing disadvantages inherent in the known types of film seals now present in the prior art, the present invention provides a new film seal construction wherein the same can be utilized for providing a seal which allows a user to easily ascertain whether a roll of film has been exposed or is a new roll of film.

The general purpose of the present invention, which will be described subsequently in greater detail, is to provide a new film seal apparatus and method which has many of the advantages of the film seals mentioned heretofore and many novel features that result in a new film seal which is not anticipated, rendered obvious, suggested, or even implied by any of the prior art film seals, either alone or in any combination thereof.

To attain this, the present invention generally comprises an elongate strip with an adhesive provided on one of the surfaces of the strip. The adhesive is adapted for adhesively coupling the first surface of the strip to an object. One of the ends of the strip has a lifting tab adapted for aiding the detachment of the strip from an object.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new film seal apparatus and method which has many of the advantages of the film seals mentioned heretofore and many novel features that result in a new film seal which is not anticipated, rendered obvious, suggested, or even implied by any of the prior art film seals, either alone or in any combination thereof.

It is another object of the present invention to provide a new film seal which may be easily and efficiently manufactured and marketed.

It is a further object of the present invention to provide a new film seal which is of a durable and reliable construction.

An even further object of the present invention is to provide a new film seal which is susceptible of a low cost of manufacture with regard to both materials and labor, and which accordingly is then susceptible of low prices of sale to the consuming public, thereby making such film seal economically available to the buying public.

Still yet another object of the present invention is to provide a new film seal which provides in the apparatuses and methods of the prior art some of the advantages thereof, while simultaneously overcoming some of the disadvantages normally associated therewith.

Still another object of the present invention is to provide a new film seal for providing a seal which allows a user to easily ascertain whether a roll of film has been exposed or is a new roll of film.

Yet another object of the present invention is to provide a new film seal which includes an elongate strip with an adhesive provided on one of the surfaces of the strip. The adhesive is adapted for adhesively coupling the first surface of the strip to an object. One of the ends of the strip has a lifting tab adapted for aiding the detachment of the strip from an object.

Still yet another object of the present invention is to provide a new film seal that is attachable either on a roll of film or on a container holding a roll of film.

Even still another object of the present invention is to provide a new film seal that may also be adapted for attachment on disposable cameras so that users may readily determine whether a disposable camera has been used.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
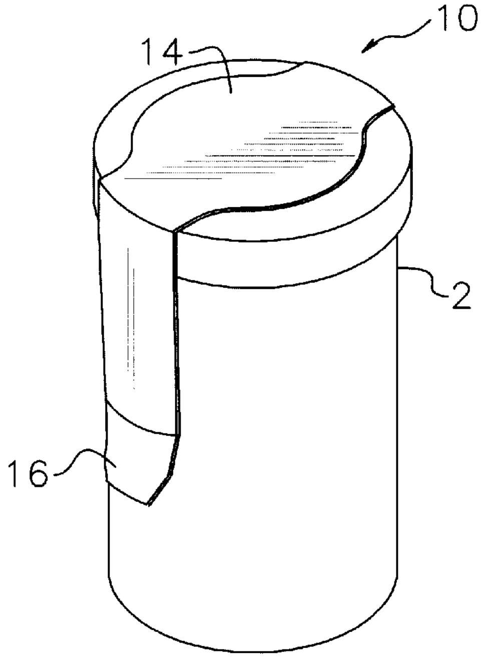
FIG. 1 is a schematic perspective view of a new film seal according on a film roll canister to the present invention.

With reference now to the drawings, and in particular to FIGS. 1 through 7 thereof, a new film seal embodying the principles and concepts of the present invention and generally designated by the reference numeral 10 will be described.

As best illustrated in FIGS. 1 through 7, the film seal 10 generally comprises an elongate strip 12 with an adhesive 15 provided on one of the surfaces of the strip 12. The adhesive 15 is adapted for adhesively coupling the first surface of the strip 12 to an object. One of the ends of the strip 12 has a lifting tab 16 adapted for aiding the detachment of the strip 12 from an object.

Figure 2:
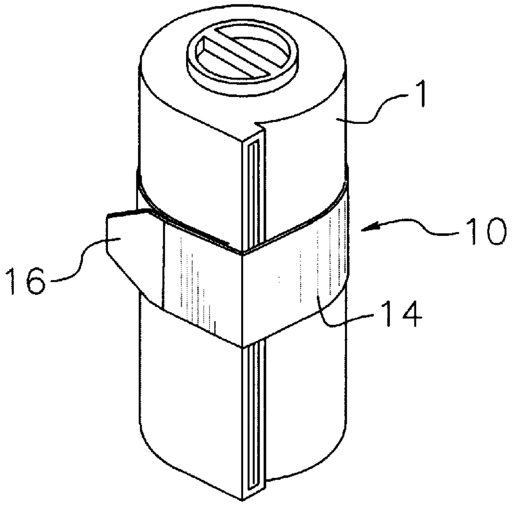
FIG. 2 is a schematic perspective view of the present invention on a roll of film.
Figure 3:
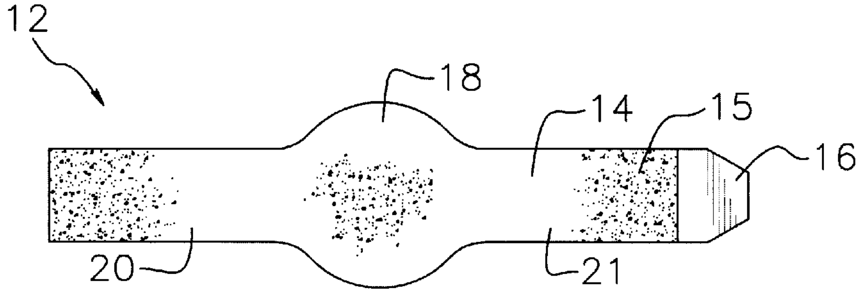
FIG. 3 is a schematic side view of one embodiment of the present invention.
Figure 4:
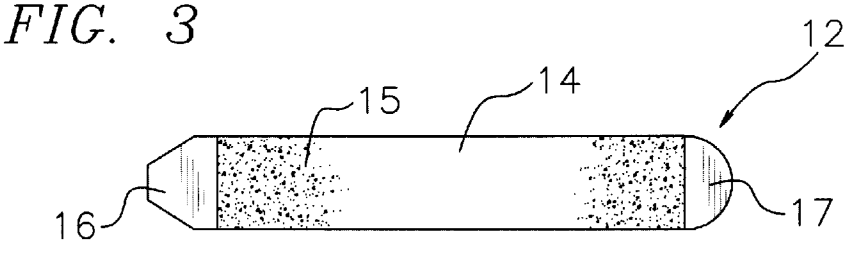
FIG. 4 is a schematic side view of a second embodiment of the present invention.

In use, the seal device 10 is designed for attachment on a generally cylindrical container of film such as a roll of film 1 or on a canister 2 for storing a roll of film. In use, the strips are attached to a container of film 1,2 to help indicate whether the film has been exposed or not. In closer detail, the elongate strip 12 has first and second surfaces 13,14, a pair of ends, a pair of side edges extending between the ends of the strip 12. The first surface of strip 12 has an adhesive 15 provided thereon. As illustrated in FIGS. 1 and 2, the adhesive 15 is adapted for adhesively coupling the first surface of the strip 12 to an object such as a film container either over a slot in a roll of film 1 or over the cap of a canister 2 for holding a roll of film. Preferably, the second surface of the strip 12 is designed for permitting a user to write on it so that, for example, the user is able to easily identify the subject mater of roll of film.

One of the ends of the strip 12 has a lifting tab 16 extending therefrom. The lifting tab 16 is adapted for aiding the detachment of the strip 12 from an object adhered to the strip 12 by the adhesive 15 on the first side of the strip 12. It should be noted that the lifting tab 16 does not has adhesive 15 applied to it. Preferably, the lifting tab 16 is generally triangular. Optionally, the other end of the strip also has a lifting tab 17 extending therefrom. This lifting tab 17 is adapted for aiding the detachment of the strip 12 from an object just like the first lifting tab 16. Preferably, this lifting tab 17 is generally hemispherical in shape.

Figure 7:
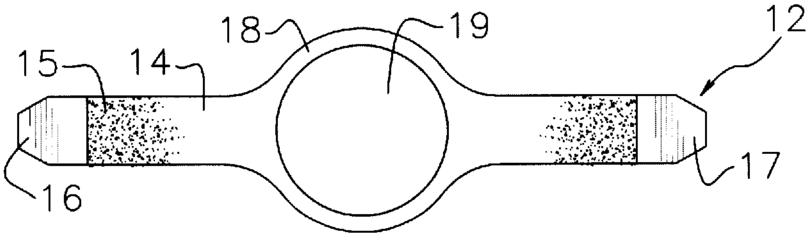
FIG. 7 is a schematic side view of an additional embodiment of the present invention.

In a preferred embodiment, the strip 12 has a generally circular portion 18 centrally positioned on the strip 12 between the ends of the strip 12 such that the circular portion 18 of the strip 12 defines a pair of diametric arm portions 20,21 of the strip 12 outwardly extending from the central portion of the strip 12. The circular portion 18 of the strip 12 is designed for placing on a circular end of a cylindrical roll of film or a cylindrical film roll canister. Optionally as illustrated in FIG. 7, the circular portion 18 of the strip 12 has a circular hole 19 therethrough between the first and second surfaces 13,14 of the strip 12. The hole 19 of the circular portion 18 is designed for positioning the rotating spool on an end of a film roll in when the circular portion 18 is placed on the end of the film roll so that the spool is free to rotate.

The strip 12 has a length defined between the ends of the strip 12 which is preferably greater than about 2 inches, with each of the lifting tabs 16,17 having a length greater than about ½ inch. The arm portions 20,21 of the strip 12 have a width defined between the side edges of the strip 12. Preferably, the width of each of the arms portions 20,21 of the strip 12 is greater than about ¼ inch and ideally about ½ inch. Preferably, the diameter of the circular portion 18 of the strip 12 is greater than about twice the width of the arm portions 20,21 of the strip 12. Even more preferably, the diameter of the circular portion 18 is greater than about ½ inch and ideally about 1 inch or 1 ½ inches. Preferably, diameter of the hole 19 of the circular portion 18 is greater than about ½ inch and ideally about 1 ¼ inches.

Figure 5:
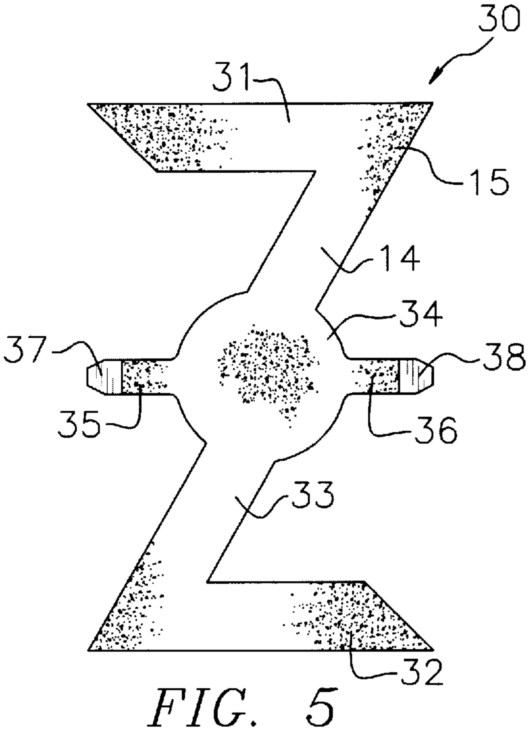
FIG. 5 is a schematic side view of the Z-shaped embodiment of the present invention.

With reference to FIG. 5, in an additional embodiment, the strip 30 is generally Z-shaped has first and second surfaces, a pair of end portions 31,32 and a cross portion 33 extending between the end portions of the strip 30. The first surface of strip has an adhesive provided thereon. The cross portion 33 of the strip has a generally circular portion 34 centrally positioned on the cross portion of the strip between the end portions of the strip. The circular portion of the cross portion has a pair of diametrically opposite lifting fingers 35,36 outwardly extending therefrom with the lengths of the lifting fingers generally parallel with the lengths of the end portions of the strip. Each of the lifting fingers has a lifting tab 37,38 adapted for aiding the detachment of the strip from an object.

Figure 6:
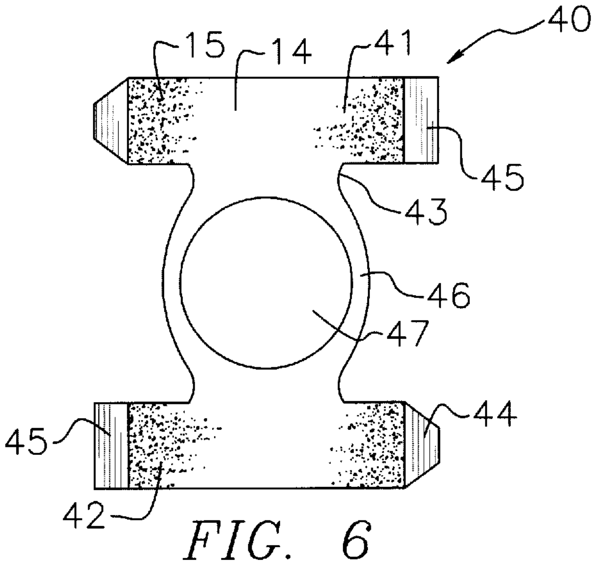
FIG. 6 is a schematic side view of the H-shaped embodiment of the present invention.

FIG. 6 illustrates a further additional embodiment. This strip 40 is generally H-shaped and has first and second surfaces, a pair of elongate portions 41,42 and a cross portion 43 extending between the elongate portions of the strip. The first surface of strip 40 has an adhesive provided thereon. Each of the elongate portions of the strip has a pair of opposite ends with each end of each of the elongate portions having a lifting tab 44,45. The cross portion of the strip has a generally circular portion 46 having a hole 47 therethrough between the first and second surfaces of the strip.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A seal device for attachment on a generally cylindrical container of film, said seal device comprising:

an elongate strip having first and second surfaces, a pair of ends, a pair of side edges extending between said ends of said strip;

said first surface of strip having an adhesive provided thereon, said adhesive being adapted for adhesively coupling said first surface of said strip to an object;

one of said ends of said strip having a lifting tab, said lifting tab being adapted for aiding the detachment of said strip from an objects wherein said strip has a generally circular portion, said circular portion of said strip being centrally positioned on said strip between said ends of said strip such that said circular portion of said strip defines a pair of arm portions of said strip outwardly extending from said central portion of said strip, said strip having a diameter; and wherein said circular portion of said strip has a hole therethrough between said first and second surfaces of said strip, said hole of said circular portion having a generally circular outer periphery, said outer periphery of said hole of said circular portion having a diameter.

2. The seal device of claim 1, wherein another of said ends has another lifting tab, said other lifting tab being adapted for aiding the detachment of said strip from an object.

3. The seal device of claim 2, wherein said other lifting tab is generally hemispherical in shape.

4. The seal device of claim 1, wherein arm portions of said strip has a width defined between said side edges of said strip, wherein said width of said strip is greater than about ¼ inch.

5. The seal device of claim 1, wherein said diameter of said circular portion of said strip is greater than about twice the width of said arm portions of said strip.

6. The seal device of claim 1 wherein diameter of said hole of said circular portion is greater than about ½ inch.

7. The seal device of claim 1, wherein said strip has a length defined between said ends of said strip, wherein said length of said strip is greater than about 2 inches.

8. A seal device for attachment on a generally cylindrical container of film, said seal device comprising:

a strip being generally Z-shaped having first and second surfaces, a pair of end portions and a cross portion extending between said end portions of said strip;

said first surface of strip having an adhesive provided thereon, said adhesive being adapted for adhesively coupling said first surface of said strip to an object;

said cross portion of said strip having a generally circular portion, said circular portion of said cross portion being centrally positioned on said cross portion of said strip between said end portions of said strip;

said circular portion of said cross portion having a pair of diametrically opposite lifting fingers outwardly extending therefrom, the lengths of said lifting fingers being generally parallel with the lengths of said end portions of said strip;

each of said lifting fingers having a lifting tab, said lifting tab being adapted for aiding the detachment of said strip from an object.

9. A seal device for attachment on a generally cylindrical container of film, said seal device comprising:

a strip being generally H-shaped and having first and second surfaces, a pair of elongate portions and a cross portion extending between said elongate portions of said strip;

said first surface of strip having an adhesive provided thereon, said adhesive being adapted for adhesively coupling said first surface of said strip to an object;

each of said elongate portions of said strip having a pair of opposite ends, each end of each of said elongate portions having a lifting tab, said lifting tab being adapted for aiding the detachment of said strip from an object;

said cross portion of said strip having a generally circular portion, said circular portion of said strip having a hole therethrough between said first and second surfaces of said strip, said hole of said circular portion having a generally circular outer periphery.

10. The seal device of claim 9, wherein another of said ends has another lifting tab, said other lifting tab being adapted for aiding the detachment of said strip from an object.

11. The seal device of claim 10, wherein said other lifting tab is generally hemispherical in shape.

12. The seal device of claim 9 wherein diameter of said hole of said circular portion is greater than about ½ inch.

13. The seal device of claim 9, wherein said strip has a length defined between said ends of said strip, wherein said length of said strip is greater than about 2 inches.

* * * * *